United States Patent [19]
Hara et al.

[11] Patent Number: 5,506,029
[45] Date of Patent: Apr. 9, 1996

[54] FIBER REINFORCED THERMOPLASTIC RESIN SHAPED ARTICLE

[75] Inventors: Takahisa Hara, Kawanishi; Masahito Matsumoto, Ibaraki; Nobuhiro Usui, Takatsuki; Takeo Kitayama, Ibaraki; Shigeyoshi Matubara, Osaka, all of Japan

[73] Assignee: Sumitomo Chemical Co., Ltd., Osaka, Japan

[21] Appl. No.: 267,523

[22] Filed: Jun. 29, 1994

Related U.S. Application Data

[62] Division of Ser. No. 992,699, Dec. 18, 1992, Pat. No. 5,356,588.

[30] Foreign Application Priority Data

Dec. 18, 1991 [JP] Japan .................................. 3-334836

[51] Int. Cl.⁶ .................................................. B29C 70/68
[52] U.S. Cl. ........................ 428/120; 428/163; 428/167
[58] Field of Search .................................. 428/119, 120, 428/163, 167; 264/257, 258, 259, 265, 328.1, 328.7, 328.12

[56] References Cited

U.S. PATENT DOCUMENTS

| | | | |
|---|---|---|---|
| 2,847,712 | 8/1958 | Pollard et al. | 264/328.12 |
| 4,123,488 | 10/1978 | Lawson | 264/255 |
| 4,385,955 | 5/1983 | Doerfling et al. | 264/257 |
| 4,645,565 | 2/1987 | Vallee et al. | 162/123 |
| 4,670,331 | 6/1987 | Raduan et al. | 264/257 |
| 4,891,176 | 1/1990 | Drysdale et al. | 264/257 |
| 4,925,615 | 5/1990 | Willis et al. | 264/257 |
| 4,937,032 | 6/1990 | Krone et al. | 264/258 |
| 4,964,935 | 10/1990 | Biggs et al. | 264/258 |
| 4,983,247 | 1/1991 | Kim | 264/255 |
| 5,034,076 | 7/1991 | Masui et al. | 264/257 |
| 5,089,206 | 2/1992 | Kia | 264/255 |
| 5,130,071 | 7/1992 | Iseler et al. | 264/257 |
| 5,190,803 | 3/1993 | Goldbach et al. | 428/120 |

FOREIGN PATENT DOCUMENTS

| | | |
|---|---|---|
| 0033638 | 8/1981 | European Pat. Off. . |
| 0329200 | 8/1989 | European Pat. Off. . |
| 60-219035 | 11/1985 | Japan . |
| 63-199620 | 8/1988 | Japan . |
| 2232373 | 12/1990 | United Kingdom . |

*Primary Examiner*—Robert B. Davis
*Attorney, Agent, or Firm*—Birch, Stewart, Kolasch & Birch

[57] ABSTRACT

A fiber reinforced thermoplastic resin shaped article is prepared by supplying a preheated fiber reinforced thermoplastic resin sheet between upper and lower molds, positioning the upper and lower molds so that a clearance between the upper and lower molds at the time of the completion of mold clamping is larger than a thickness of the unpreheated fiber reinforced thermoplastic resin sheet, and supplying a molten thermoplastic resin in a recess provided in at least one of the upper and lower molds through a resin passage provided in the mold so that a portion formed from the molten thermoplastic resin in the recess is integrated by fusion with a portion formed from the fiber reinforced thermoplastic resin sheet. The article is light-weight and also has a rib, a boss or any other projection.

8 Claims, 2 Drawing Sheets

FIBER REINFORCED THERMOPLASTIC RESIN SHAPED ARTICLE

This application is a divisional of application Ser. No. 07/992,699, filed on Dec. 18, 1992 now U.S. Pat. No. 5,356,588, the entire contents of which are hereby incorporated by reference.

BACKGROUND OF THE INVENTION

1. Field of the Invention

The present invention relates to a fiber reinforced thermoplastic resin shaped article and a method for preparing said article. The article of the present invention has excellent strength reinforced by fibers and a light weight feature, has a rib, a boss or any other projection and is suitably utilized as a vehicle part and the like.

2. Description of Related Art

One of known methods for preparing a fiber reinforced resin shaped article comprises heating and pressing a fiber reinforced thermoplastic resin sheet to prepare a product. Depending on the reinforcing fiber, this method is classified into two types. One type comprises mixing monofilaments each having a medium fiber length of from several millimeters to 100 mm with thermoplastic resin powder under a wet or dry condition, forming a fiber reinforced thermoplastic resin sheet by a heating roll press, preheating the sheet and then pressing the sheet to obtain a fiber reinforced thermoplastic resin shaped article (cf., for example, U.S. Pat. No. 4,645,565 corresponding to Japanese Patent Kokai Publication No. 28135/1982). The other type comprises extruding a molten thermoplastic resin on a mat consisting of long fibers, laminating them, forming a fiber reinforced thermoplastic resin sheet through rollers, and preheating and pressing the sheet to obtain a fiber reinforced thermoplastic resin shaped article.

When the fiber reinforced thermoplastic resin sheet is preheated to press it, the sheet expands in a thickness direction. The sheet is supplied between upper and lower molds, a clamp clearance is set to a distance greater than a thickness of the unheated reinforced thermoplastic resin sheet and the sheet is pressurized and cooled to obtain a shaped article having a larger thickness than that of the unheated fiber reinforced thermoplastic resin sheet, namely a shaped article having a larger volume than that of the unheated fiber reinforced thermoplastic resin sheet. Hereinafter, this is referred to as "expansion shaping". U.S. Pat. No. 4,670,331 (corresponding to Japanese Patent Kokai Publication No. 179234/1985) discloses a method comprising conducting the expansion shaping in this way to obtain a fiber reinforced thermoplastic resin shaped article having a large volume and a light weight.

In the expansion shaping, a flat sheet made of a fiber reinforced thermoplastic resin is preheated, and supplied and pressurized between upper and lower molds to form a sheet having a larger thickness than that of the original unpreheated fiber reinforced thermoplastic resin sheet. Accordingly, even if a recess is provided in the mold to give a rib, a boss or any other projection to the sheet, the preheated fiber reinforced thermoplastic resin sheet is merely pressurized mainly in a sheet thickness direction between the molds, and the sheet does not flow along a mold surface so that the recess is never or insufficiently filled with the fiber reinforced thermoplastic resin sheet. Accordingly, it is difficult to mold a fiber reinforced thermoplastic resin shaped article having a rib, a boss or any other projection.

SUMMARY OF THE INVENTION

Intensive study has been made to obtain a shaped article having a rib, a boss or any other projection by the expansion shaping of a fiber reinforced thermoplastic resin sheet, and then the present invention has been completed.

The present invention provides a method for preparing a fiber reinforced thermoplastic resin shaped article comprising the steps of preheating a fiber reinforced thermoplastic resin sheet to expand it in a thickness direction, supplying the expanded sheet between a first mold and a second mold, and then pressurizing and cooling the sheet under the condition that a clearance between the first mold and the second mold at the time of the completion of mold clamping is larger than a thickness of the original unheated fiber reinforced thermoplastic resin sheet, characterized in that a molten thermoplastic resin is supplied in a recess provided in at least one of the first and second molds through a resin passage provided in the mold so that a portion formed from the molten thermoplastic resin in the recess is integrated by fusion with a portion formed from the fiber reinforced thermoplastic resin sheet.

The method according to the present invention produces the fiber reinforced thermoplastic resin shaped article having a rib, a boss or any other projection attached thereto with sufficient bonding strength, which has light weight resulting from the expansion shaping.

DETAILED DESCRIPTION OF THE INVENTION

Specific examples of a reinforcing fiber used in the fiber reinforced thermoplastic resin sheet are an inorganic fiber, for example, a glass fiber, a carbon fiber and a metal (e.g. stainless steel) fiber; an organic fiber, for example, an aramid fiber and; a mixture of inorganic and organic fibers. In particular, the glass fiber is economical and gives a high reinforcing effect. A diameter of the fiber is usually from 1 to 50 µm, preferably from 3 to 25 µm. A length of the fiber is usually at least 5 mm, preferably from 5 to 50 mm in view of the reinforcing effect.

A matrix resin reinforced by the fiber in the fiber reinforced thermoplastic resin sheet may be any one of thermoplastic resins usually used in extrusion molding, injection molding, press molding or the like. Specific examples of the matrix resin are polyethylene, polypropylene, polystyrene, acrylonitrile/styrene/butadiene terpolymer, polyvinyl chloride, polyamide, polycarbonate, polyethylene terephthalate, polybutylene terephthalate, styrene/acrylonitrile copolymer, a mixture thereof, and a polymer alloy containing them.

The fiber reinforced thermoplastic resin sheet may be a sheet formed by a paper making method from fibers each having a medium length and thermoplastic resin powder under a wet or dry condition, or a sheet formed by laminating and impregnating a long fiber mat with a molten thermoplastic resin through heating rollers.

The molten thermoplastic resin, which is supplied in the recess of the mold through the resin passage provided in the mold so as to form the rib, the boss or any other projection of the shaped article, may be a thermoplastic resin having good thermal fusion to the matrix resin of the fiber reinforced thermoplastic resin sheet. The molten thermoplastic resin may be the same as or analogous to the matrix resin. The molten thermoplastic resin may contain fibers.

Hereinafter, the present invention will be described in detail by making reference to the attached drawings.

Figure 1:
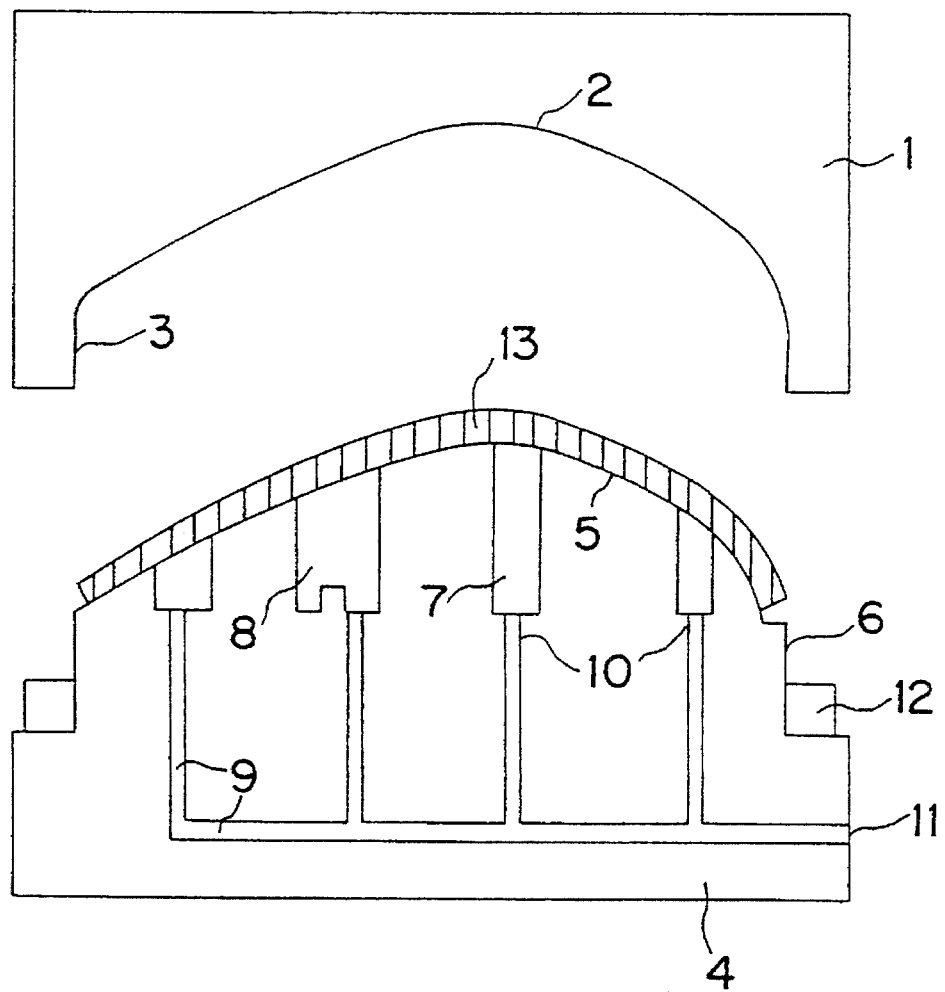
FIGS. 1 and 2 are cross-sectional views of a mold assembly used according to the present invention, showing different operative positions, respectively.

FIG. 1 is a cross-sectional view of a mold assembly used according to the present invention. An upper mold 1 is attached to an upper platen of a pressing machine which moves up and down. A shaping surface of the upper mold is represented by 2 and a vertical internal surface of the upper mold is represented by 3. A lower mold 4 is attached to a fixed lower platen of the pressing machine. A shaping surface of the lower mold is represented by 5. The vertical internal surface 3 of the upper mold slides on a vertical external surface 6 of the lower mold. A recess for forming a rib is represented by 7 and a recess for forming a boss is represented by 8. A resin passage is represented by 9 and a resin feed outlet is represented by 10. An end 11 of the resin passage is connected with a resin supplying apparatus (not shown) for supplying a molten thermoplastic resin in a desired amount and pressure. A stopper is represented by 12 and a preheated fiber reinforced thermoplastic resin sheet is represented by 13.

The fiber reinforced thermoplastic resin sheet is preheated in an oven or the like at a temperature at which it is easy to handle the resin sheet for positioning it on the lower mold and it is easy to mold the resin sheet without thermal degradation. Then, the resin sheet is positioned on the lower mold.

A suitable preheating temperature depends on the fiber reinforced thermoplastic resin sheet. The preheating temperature is higher by usually from 10° to 100° C., preferably from 20° to 60° C. than the melting point of the matrix resin. For example, the fiber reinforced thermoplastic resin sheet is preheated at a temperature of from 200° to 250° C., when the reinforcing fiber is a glass fiber and the matrix resin is polypropylene. When the preheating temperature is lower than the above lower limit, the expansion is insufficient. When it is higher than the above upper limit, the fiber reinforced thermoplastic resin sheet is thermally degraded and the handling is difficult.

For example, when a glass fiber reinforced polypropylene sheet of 2 mm in thickness is heated at 200° to 250° C., the sheet expands to have a thickness of 6 mm. Then, when the sheet is compressed into a shaped article having a thickness of 4 mm, the shaped article is obtained in an expansion coefficient (the thickness of the shaped article/the thickness of the original unpreheated fiber reinforced thermoplastic resin sheet) of 2.0 (4 mm/2 mm).

Figure 2:
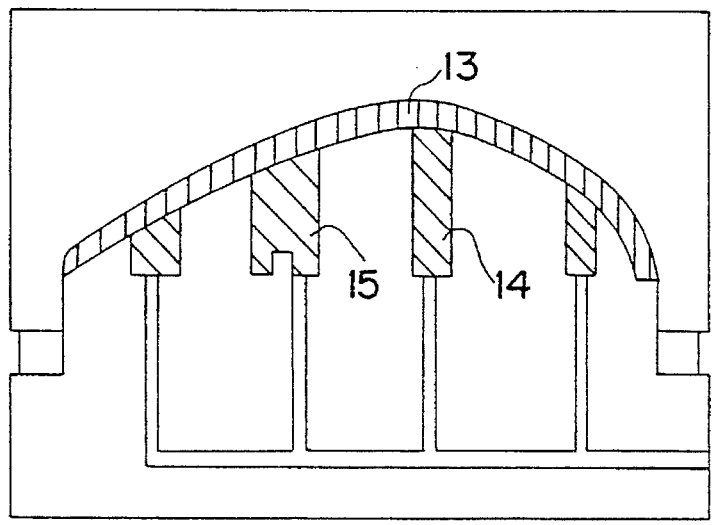

As shown in FIG. 1, the preheated fiber reinforced thermoplastic resin sheet is positioned on the shaping surface 5 of the lower mold and then the upper mold 1 is moved downward. Since the internal surface 3 of the upper mold slides on the external surface 6 of the lower mold so that the upper and lower molds are closed together, the softened fiber reinforced thermoplastic resin sheet does not flow out of the molds. When the upper mold 1 is further moved downward, a lowest end of the upper mold 1 abuts against the stopper 12 so that the downward movement of the upper mold 1 is terminated (cf. FIG. 2). During the closure of the molds, the fiber reinforced thermoplastic resin sheet 13 is compressed between the shaping surface 2 of the upper mold and the shaping surface 5 of the lower mold. In FIG. 2, a height of the stopper 12 is selected so that a clearance between the shaping surface 2 of the upper mold and the shaping surface 5 of the lower mold is larger than a thickness of the original preheated fiber reinforced thermoplastic resin sheet.

Temperatures of the upper and lower molds are, the same or different, usually from 10° to 120° C., preferably from 30° to 100° C. The temperature of the molten thermoplastic resin fed in the mold is higher by usually from 20° to 150° C., preferably from 30° to 100° C. than a melting point of the molten thermoplastic resin.

Figure 3:
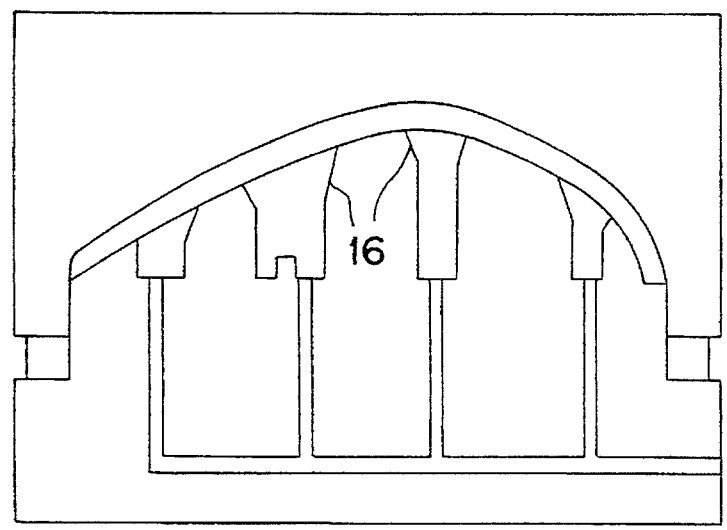
FIG. 3 is a cross-sectional view of a modified form of the mold assembly used according to the present invention.

At the time of or before or after the upper mold 1 reaching the lowest position shown in FIG. 2, a desired amount of the molten thermoplastic resin is supplied from the resin feed outlet 10 through the resin passage 9 and filled in the recesses 7 and 8 of the lower mold for forming the rib 14 and boss 15 so that the rib and the boss of the shaped article are formed and integrated by fusion with a portion formed from the fiber reinforced thermoplastic resin sheet. The molten thermoplastic resin is supplied preferably after the upper mold 1 reaches the lowest position, since the article having good appearance and shape is obtained. For the sufficient fusion, preferably, the thermoplastic resin supplied from the resin feed outlet 10 is analogous to and has high thermal fusion bonding strength to the matrix resin of the fiber reinforced thermoplastic resin sheet. Since the preheating temperature of the fiber reinforced thermoplastic resin sheet is limited in view of degradation and handling, the thermoplastic resin preferably has a higher temperature than that of the fiber reinforced thermoplastic resin sheet. It is advantageous to enlarge openings 16 of the recesses 7 and 8 of the mold for forming the rib 14, the boss 15 and the like, as shown in FIG. 3.

When the recess 7 has a volume remarkably different from that of the recess 8, a regulator mechanism may be employed for controlling the cross-section area of each resin feed outlet 10 to regulate the amount of the resin supplied into each recess. The regulator mechanism may be a type capable of selectively opening and closing each resin feed outlet 10 to adjust the length of time over which the resin is supplied. With this regulator mechanism, the filling of the resin into each recess can be advantageously improved.

A skin material may be laminated on the fiber reinforced thermoplastic resin sheet in the mold assembly.

PREFERRED EMBODIMENTS OF THE INVENTION

The present invention will be illustrated by following Examples which do not limit the present invention.

EXAMPLE 1

A fiber reinforced thermoplastic resin sheet used was that of 2.0 mm in thickness (manufactured by K-PLASHEET Corp., Japan) prepared by a paper making method under a wet condition in which glass fibers (30% by weight) of 12–13 mm in an average length was used as reinforcing fibers and polypropylene was used as a matrix resin. The fiber reinforced thermoplastic resin sheet was preheated at 210° C. in an oven and then immediately positioned on the shaping surface of the lower mold as shown in FIG. 1. The upper mold was moved downward. Then, compression was commenced and simultaneously a molten thermoplastic resin was supplied in recesses of the lower mold from the resin feed outlet through the resin passage. Polypropylene (SUMITOMO NOBLEN® AX 568 manufactured by Sumitomo Chemical Company, Ltd., Melt index: 65) used as the molten thermoplastic resin was supplied at 240° C. The molding was conducted under the conditions that the surfaces 2 and 5 of the upper and lower molds were at temperatures of 60° C. and 50° C., respectively, a pressing pressure (horizontal projection plane) was 40 kg/cm² and the height of the stopper 12 was adjusted to give a shaped article of 3.0 mm in thickness at a sheet portion thereof excluding the rib and boss. A fiber reinforced thermoplastic resin shaped article having an expansion coefficient of 1.5, to which the rib and boss were fully fused, was obtained.

EXAMPLE 2

The same procedure as in Example 1 was repeated except that a sheet having a glass fiber content of 40% by weight and a thickness of 3.0 mm which was prepared by impregnating a glass long fiber mat with molten polypropylene was used as the fiber reinforced thermoplastic resin sheet, and the height of the stopper was adjusted to give a shaped article of 5.0 mm in thickness at a sheet portion thereof excluding the rib and boss. A fiber reinforced thermoplastic resin shaped article having an expansion coefficient of 1.7, to which the rib and boss were fully fused, was obtained.

What is claimed is:

1. A fiber reinforced thermoplastic resin shaped article prepared by a method comprising the steps of:

preheating an unheated fiber reinforced thermoplastic resin sheet to expand it in a thickness direction, supplying the expanded sheet between a first mold and a second mold, pressurizing the sheet under the condition that a clearance between the first mold and the second mold at the time of the completion of mold clamping is larger than a thickness of the original unheated fiber reinforced thermoplastic resin sheet, supplying a molten thermoplastic resin in a recess provided in at least one of the first and second molds through a resin passage provided in the mold, so that a portion formed from the molten thermoplastic resin in the recess is integrated by fusion with a portion formed from the fiber reinforced thermoplastic resin sheet, and cooling the sheet.

2. The article according to claim 1, wherein said molten thermoplastic resin is selected to have good thermal fusion to the matrix resin of said fiber reinforced thermoplastic resin sheet.

3. The article according to claim 2, wherein said molten thermoplastic resin is the same as the matrix resin of said fiber reinforced thermoplastic resin sheet.

4. The article according to claim 1, wherein said molten thermoplastic resin forms a projection from the fiber reinforced thermoplastic resin sheet.

5. The article according to claim 4, wherein said projection is a rib or a boss.

6. The article according to claim 1, wherein said molten thermoplastic resin contains fibers.

7. The article according to claim 1, wherein said fiber reinforced thermoplastic resin has a matrix resin selected from the group consisting of polyethylene, polypropylene, polystyrene, acrylonitrile/styrene/butadiene terpolymer, polyvinyl chloride, polyamide, polycarbonate, polyethylene terephthalate, polybutylene terephthalate, styrene/acrylonitrile copolymer and mixtures thereof.

8. The article according to claim 1, wherein said fiber reinforced thermoplastic resin sheet contains fibers selected from the group consisting of inorganic fibers, organic fibers and mixtures thereof.

* * * * *